(12) United States Patent
Chen et al.

(10) Patent No.: US 11,687,715 B2
(45) Date of Patent: Jun. 27, 2023

(54) SUMMARY GENERATION METHOD AND APPARATUS

(71) Applicant: BEIJING BAIDU NETCOM SCIENCE AND TECHNOLOGY CO., LTD., Beijing (CN)

(72) Inventors: Moye Chen, Beijing (CN); Wei Xu, Beijing (CN); Jiachen Liu, Beijing (CN); Xinyan Xiao, Beijing (CN); Qiaoqiao She, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 198 days.

(21) Appl. No.: 16/890,685

(22) Filed: Jun. 2, 2020

(65) Prior Publication Data

US 2021/0182491 A1 Jun. 17, 2021

(30) Foreign Application Priority Data

Dec. 12, 2019 (CN) .......................... 201911272761.1

(51) Int. Cl.
*G06F 40/258* (2020.01)
*G06F 40/289* (2020.01)

(52) U.S. Cl.
CPC .......... *G06F 40/289* (2020.01); *G06F 40/258* (2020.01)

(58) Field of Classification Search
CPC .... G06F 16/345; G06F 40/295; G06F 16/313; G06F 16/3344; G06F 40/289; G06F 40/258
See application file for complete search history.

(56) References Cited

U.S. PATENT DOCUMENTS 6,537,325 B1 * 3/2003 Nishizawa ............ G06F 16/345
707/E17.084
8,650,483 B2 * 2/2014 Liu ....................... G06F 16/345
715/254

(Continued)

FOREIGN PATENT DOCUMENTS

CN 104636465 A 5/2015
CN 105677764 A 6/2016

(Continued)

OTHER PUBLICATIONS

Lemarie et al, "Understanding How Headings Influence Text Processing", publisher: OpenEdition Journals, published: Oct. 2012, pp. 1-15 (Year: 2012).*

(Continued)

*Primary Examiner* — Wilson W Tsui
(74) *Attorney, Agent, or Firm* — Seed IP Law Group LLP

(57) ABSTRACT

Embodiments of the application disclose a summary generation method and apparatus. A specific embodiment of the method comprises: acquiring a target article including a headline and a body of the article; determining whether a question is included in the headline; determining, in the body of the article, an information-satisfied-paragraph including an answer to the question, in response to determining that the question is included in the headline; and generating a summary of the target article based on the determined information-satisfied-paragraph. The above embodiment may generate a summary that directly satisfies the users' demand for information.

12 Claims, 6 Drawing Sheets

(56) References Cited

U.S. PATENT DOCUMENTS

| | | | |
|---|---|---|---|
| 9,466,294 B1* | 10/2016 | Tunstall-Pedoe | G10L 15/22 |
| 9,582,482 B1* | 2/2017 | Sharifi | G06F 16/24578 |
| 2008/0027935 A1* | 1/2008 | Sarid | G06F 16/338 |
| 2008/0104506 A1* | 5/2008 | Farzindar | G06F 16/345 707/999.1 |
| 2009/0259642 A1 | 10/2009 | Cao et al. | |
| 2012/0143595 A1* | 6/2012 | Li | G06F 16/345 704/E11.001 |
| 2013/0021346 A1* | 1/2013 | Terman | G09B 5/08 345/467 |
| 2013/0238601 A1 | 9/2013 | Kanemoto et al. | |
| 2014/0330794 A1* | 11/2014 | Dellenbach | H04L 51/52 707/748 |
| 2015/0193429 A1* | 7/2015 | Bohra | G06F 16/3329 704/9 |
| 2015/0254213 A1* | 9/2015 | McGushion | G06F 3/04842 715/202 |
| 2015/0339288 A1* | 11/2015 | Baker | G06F 40/166 704/9 |
| 2018/0349360 A1* | 12/2018 | Mabbu | G06Q 50/01 |

FOREIGN PATENT DOCUMENTS

| | | |
|---|---|---|
| JP | 2005-242624 A | 9/2005 |
| JP | 2008-129692 A | 6/2008 |
| JP | 2011-257878 A | 12/2011 |
| JP | 2013-214294 A | 10/2013 |

OTHER PUBLICATIONS

Chinese Office Action for Chinese Application No. 201911272761.1, dated Sep. 18, 2020, 6 pages.

* cited by examiner

SUMMARY GENERATION METHOD AND APPARATUS

CROSS-REFERENCE TO RELATED APPLICATIONS

This application claims priority to Chinese Patent Application No. 201911272761.1, filed on Dec. 12, 2019, titled "A Summary Generation Method and Apparatus", which is hereby incorporated by reference in its entirety.

TECHNICAL FIELD

Embodiments of the present application relate to the field of computer technology. More particularly, embodiments of the present application relate to a summary generation method and apparatus.

BACKGROUND

The query-focused summarization is a kind of summary generation method which is inclined to satisfy the users' demand for information. Specifically, conventional summaries aim to cover the key content of an article, while the query-focused summarization aims to answer users' questions.

At the same time, with the rapid information flow, self-media articles, articles with sensational headline, and articles issued from public account are emerging from the Internet. Such articles are not only huge in quantity, but also quite different from traditional news articles in terms of article structure and content. Such articles tend to have incomplete narrative structures, and the meanings of their headline are unclear. Sometimes, "suspense" is intentionally set on the headlines of these articles to attract readers.

SUMMARY

Embodiments of the present application provide a summary generation method and apparatus.

In a first aspect of the present application, an embodiment of the present application provides a summary generation method including: acquiring a target article including a headline and a body of the article; determining whether a question is included in the headline; in response to determining that the question is included in the headline, determining, in the body of the article, an information-satisfied-paragraph including an answer to the question; generating a summary of the target article based on the determined information-satisfied-paragraph.

In some embodiments, determining whether a question is included in the headline comprises at least one of: determining that the question is included in the headline, where the headline is an interrogative sentence; determining that the question is included in the headline, where the headline includes a referential relationship but does not include an object to which the referential relationship refers; and determining that the question is included in the headline, where the headline includes at least one word in a preset set of words.

In some embodiments, determining an information-satisfied-paragraph in the body of the article comprises: determining similarities between the headline and each paragraph in the body of the article; and determining a paragraph corresponding to a maximum similarity of determined similarities as the information-satisfied-paragraph.

In some embodiments, generating a summary of the target article based on the determined information-satisfied-paragraph comprises: generating, from the information-satisfied-paragraph and at least one paragraph following the information-satisfied-paragraph, the summary.

In some embodiments, generating a summary of the target article based on the determined information-satisfied-paragraph comprises: generating, from the information-satisfied-paragraph and at least one paragraph preceding the information-satisfied-paragraph, the summary, in response to determining that a start word of the information-satisfied-paragraph is a conjunction.

In some embodiments, generating a summary of the target article based on the determined information-satisfied-paragraph comprises: deleting invalid statements in at least one of: the information-satisfied-paragraph, at least one paragraph preceding the information-satisfied-paragraph, and at least one paragraph following the information-satisfied-paragraph; and generating the summary based on each paragraph with the invalid statements deleted.

In some embodiments, generating a summary of the target article based on the determined information-satisfied-paragraph comprises: intercepting a plurality of sentences in the information-satisfied-paragraph in response to determining that a number of words in the information-satisfied-paragraph is greater than a preset word number threshold; and determining the intercepted sentences as the summary.

In a second aspect of present application, an embodiment of the present application provides a summary generation apparatus. The apparatus comprises an acquisition unit configured to acquire a target article including a headline and a body of the article; a judging unit configured to determine whether a question is included in the headline; a determining unit configured to determine, in the body of the article, an information-satisfied-paragraph including an answer to the question, in response to determining that the question is included in the headline; and a generating unit configured to generate a summary of the target article based on the determined information-satisfied-paragraph.

In some embodiments, the judging unit is further configured to perform at least one of: determining that the question is included in the headline, where the headline is an interrogative sentence; determining that the question is included in the headline, where the headline includes a referential relationship but does not include an object to which the referential relationship refers; and determining that the question is included in the headline, where the headline includes at least one word in a preset set of words.

In some embodiments, the determining unit is further configured to determine similarities between the headline and each paragraph in the body of the article; and determine a paragraph corresponding to a maximum similarity of determined similarities as the information-satisfied-paragraph.

In some embodiments, the generating unit is further configured to generate, from the information-satisfied-paragraph and at least one paragraph following the information-satisfied-paragraph, the summary.

In some embodiments, the generating unit is further configured to generate, from the information-satisfied-paragraph and at least one paragraph preceding the information-satisfied-paragraph, the summary in response to determining that a start word of the information-satisfied-paragraph is a conjunction.

In some embodiments, the generating unit is further configured to delete invalid statements in at least one of: the information-satisfied-paragraph, at least one paragraph preceding the information satisfied paragraph, and at least one paragraph following the information-satisfied-paragraph; and generate a summary based on each paragraph with the invalid statements deleted.

In some embodiments, the generating unit is further configured to intercept a plurality of sentences in the information-satisfied-paragraph in response to determining that a number of words in the information-satisfied-paragraph is greater than a preset word number threshold; and determine the intercepted sentences as the summary.

Ina third aspect of present application, embodiments of the present application provide an electronic apparatus. The electronic apparatus comprises: one or more processors; and storage devices on which one or more programs are stored. When the one or more programs are executed by the one or more processors, the one or more processors implement the method as described in any one of the embodiments of the first aspect.

In a fourth aspect of present application, embodiments of the present application provide a non-transitory computer-readable medium storing computer programs. When the computer programs are executed by the processor, the method as described in any embodiment of the first aspect is implemented.

According to the summary generation method and apparatus provided in the above embodiments of the present application, whether or not a question is included in the headline of the target article may be determined after the target article is acquired. If the question is included in the headline, an information-satisfied-paragraph is determined in the body of the target article. Finally, a summary of the target article is generated based on the determined information-satisfied-paragraph. According to the methods of the above embodiments, it is possible to generate a summary that directly satisfies the users' demand for obtaining information.

BRIEF DESCRIPTION OF THE DRAWINGS

Other features, objects, and advantages of the present application will become more apparent upon reading the detailed description of non-limiting embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
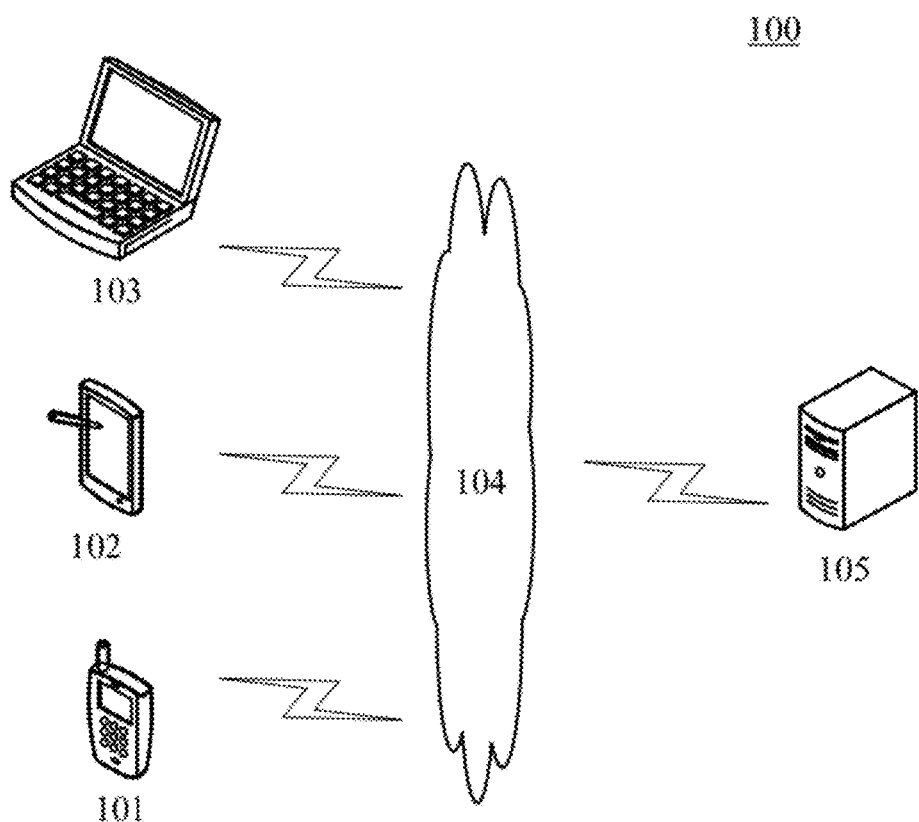
FIG. 1 is an architectural diagram of an example system in which an embodiment of the present application may be implemented.

FIG. 1 illustrates an exemplary system architecture 100 in which an embodiment of a summary generation method or a summary generation apparatus of the present application may be implemented.

As shown in FIG. 1, the system architecture 100 may include terminal devices 101, 102 and 103, a network 104, and a server 105. The network 104 serves as a medium providing a communication link between the server 105 and the terminal devices 101, 102,103. The network 104 may include various types of connections, such as wired or wireless transmission links, or optic fiber, etc.

The user may use the terminal devices 101, 102 and 103 to interact with the server 105 through the network 104, in order to transmit or receive messages, etc. Various communication client applications, such as web browser applications, shopping applications, search applications, instant messaging tools, mailbox clients, and social platform software may be installed on the terminal devices 101, 102 and 103.

Terminal devices 101, 102 and 103 may be hardware or software. When the terminal devices 101, 102 and 103 are hardware, they may be various electronic devices with display screens and capable of webpage browsing, including but not limited to smartphones, tablet computers, laptop computers, desktop computers, etc. When the terminal devices 101, 102 and 103 are software, they may be installed in the electronic devices listed above. It may be implemented as a plurality of software or software modules (e.g., for providing distributed services) or as a single software or software module. There is no specific limit herein.

The server 105 may be a server providing various services, such as a background webpage server providing support for web pages displayed on the terminal devices 101, 102 and 103. The background webpage server may analyze and process the received webpage request data, etc., and feed the processing result (such as a summary of an article in the webpage) back to the terminal devices 101, 102, and 103.

It should be noted that the server 105 may be hardware or software. When the server 105 is hardware, it may be implemented as a distributed server cluster composed of multiple servers or as a single server. When the server 105 is software, it may be implemented as a plurality of software or software modules (e.g., for providing distributed services), or as a single software or software module. There is no specific limit herein.

It should be noted that the summary generation method provided in the embodiments of the present application may be executed by the terminal devices 101, 102 and 103, or may be executed by the server 105. Accordingly, the summary generation apparatus may be installed in the terminal devices 101, 102 and 103, or may be installed in the server 105.

It should be understood that the number of terminal devices, networks and servers in FIG. 1 is only schematic.

There may be any number of terminal devices, networks, and servers according to the implementation needs.

Figure 2:
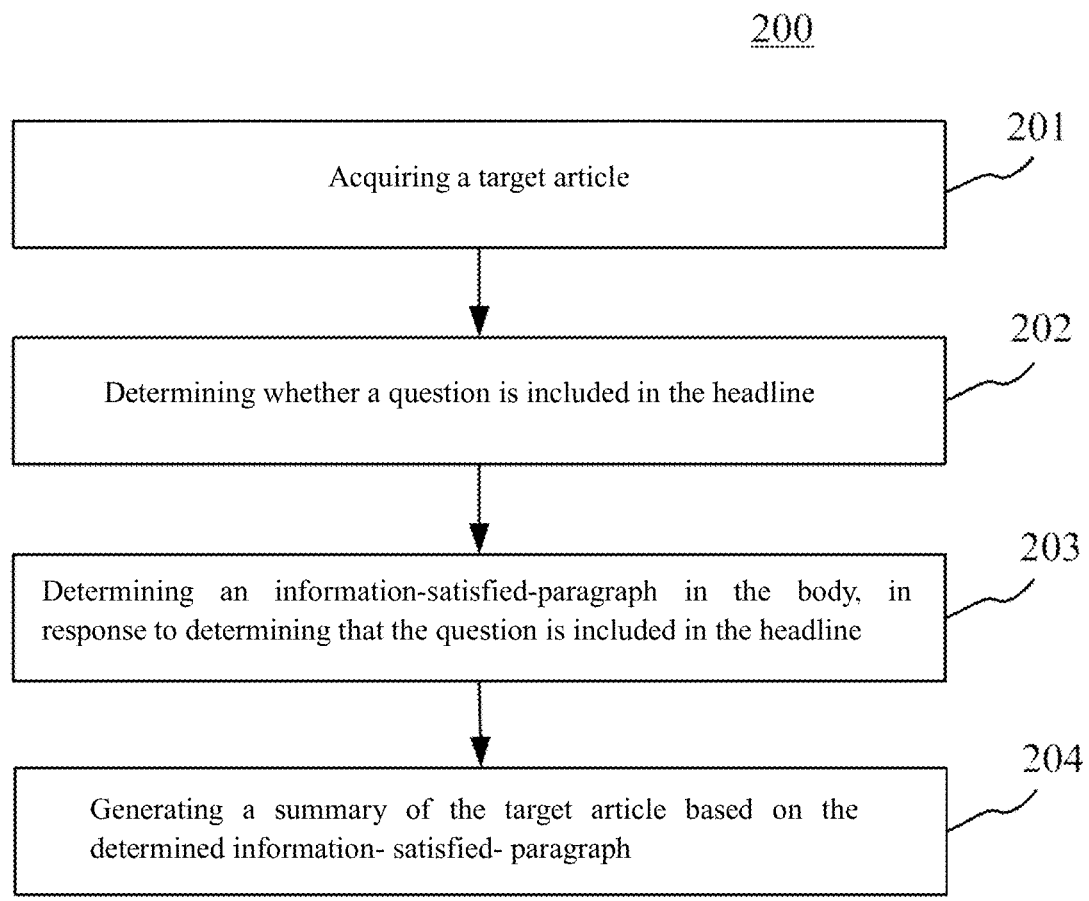
FIG. 2 is a flowchart of a summary generation method according to an embodiment of the present application.

Continuing with reference to FIG. 2, flow 200 of a summary generation method according to an embodiment of the present application is shown. The summary generation method of this embodiment includes the following steps:

Step 201, acquiring a target article.

In the embodiment, the executive entity of the summary generation method (for example, the server 105 shown in FIG. 1) may acquire the target article by wired transmission links or wireless transmission links. Here, the target article may be an article published in a webpage or may be an article in articles issued from public account. The target article may include a headline and a body of the article, and the body of the article may include a plurality of paragraphs, and may include pictures, tables, and the like.

Step 202, determining whether a question is included in the headline.

After acquiring the target article, the executive entity may determine whether a question is included in the headline. The above question may be an explicit question or an implicit question. An explicit question refers to a question including interrogative sentences or question marks, for example, "What does it mean to walk alone?". An implicit question refers to a question including a referential relationship, for example, "Take it for abalone, it is more tasty than true abalone!". The implicit question generally does not give an object to which the above-mentioned reference relationship refers, but requires users to read the body of the article to obtain an answer.

In some alternative implementations of the embodiment, the executive entity may determine whether a question is included in the headline by at least one of the following ways not shown in FIG. 2: determining that the question is included in the headline, where the headline is an interrogative sentence; determining that the question is included in the headline, where the headline includes a referential relationship but does not include an object to which the referential relationship refers; and determining that the question is included in the headline, where the headline includes at least one word in a preset set of words.

In the above implementation, if the headline is an interrogative sentence, it is determined that the question is included in the headline, and the question is an explicit question. If an article including a referential relationship but not including an object to which the referential relationship refers, it is determined that a question is included in the headline, and the question is an implicit problem. If at least one word in the preset set of words is included in the headline, it is determined that a question is included in the headline. The above preset set of words may include "why", "what", "this operation", etc. By comparing the headline with the set of preset words, the question may be the explicit question as well as the implicit question.

Step 203, determining, in the body of the article, an information-satisfied-paragraph including an answer to the question, in response to determining that the question is included in the headline.

After determining that the question is included in the headline, the executive entity may determine that an information-satisfied-paragraph in the body of the article. In the embodiment, the information-satisfied-paragraph is a paragraph including an answer to the question. Specifically, the executive entity may determine that the information-satisfied-paragraph in a plurality of ways, for example, the paragraph with a maximum similarity to the headline may be determined as the information-satisfied-paragraph. Alternatively, the executive entity may determine the Nth paragraph as the information-satisfied-paragraph. Here, N is a preset value.

In some alternative implementations of the embodiment, the executive entity may determine that the information-satisfied-paragraphs by determining the similarities between the headline and the paragraphs in the body of the article by the steps not shown in FIG. 2: determining similarities between the title and each paragraph in the body of the article; and determining a paragraph corresponding to a maximum similarity of determined similarities as the information-satisfied-paragraph.

In the embodiment, the executive entity may calculate the similarities between the headline and each paragraph in the body of the article, respectively. Then, the paragraph corresponding to the maximum similarity of determined similarities is determined as the paragraph containing the answer that is, information-satisfied-paragraph. It will be understood that the calculation of similarity belongs to the prior art, and will not be repeated here.

Step 204: generating a summary of the target article based on the determined information-satisfied-paragraph.

After determining the information-satisfied-paragraph in the body of the article, the executive entity may generate a summary of the target article based on the information-satisfied-paragraph. Specifically, the executive entity may generate from the information-satisfied-paragraph and/or at least one paragraph following the information-satisfied-paragraph, and/or at least one paragraph preceding the information-satisfied-paragraph, the summary. It may be understood that the above summary includes the answer to the question in the headline, and the user may determine the answer to the question by browsing the summary so that it is not necessary to click the headline to enter the body of the article to find the answer.

Figure 3:
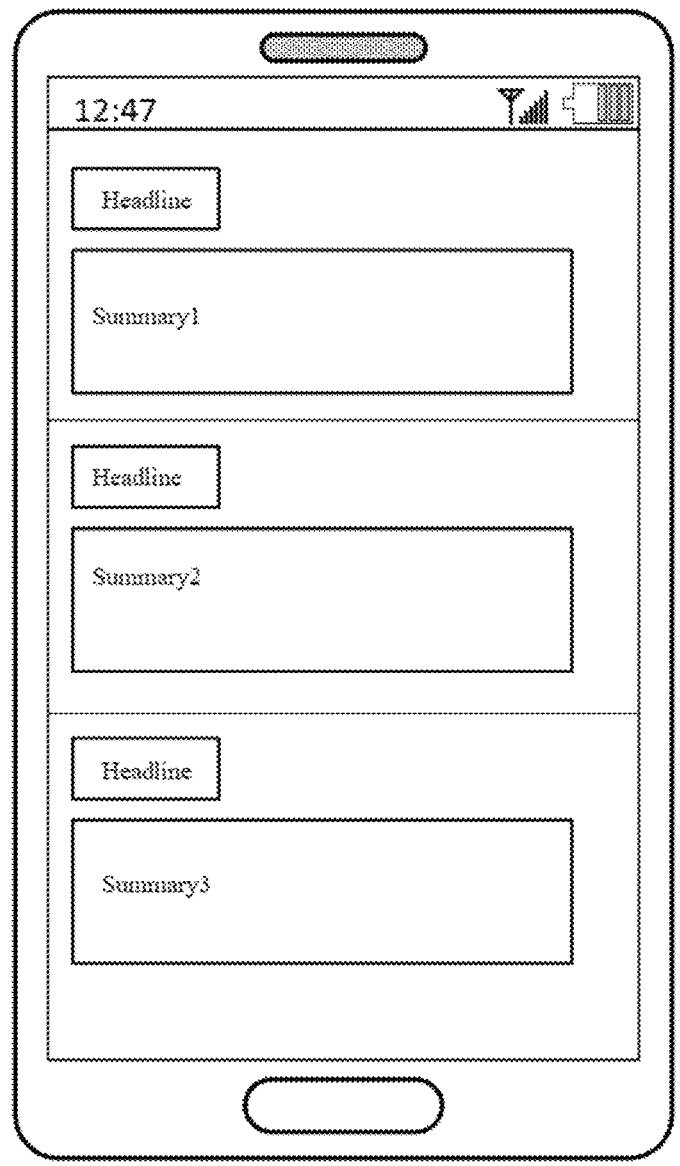
FIG. 3 is a schematic diagram of a disclosure scenario of a summary generation method according to the present application.

Continuing with reference to FIG. 3, FIG. 3 is a schematic diagram of a disclosure scenario of a summary generation method according to one embodiment of the present application. In the disclosure scenario of FIG. 3, users browse articles displayed by the browser installed in the terminal. The terminal may send each article in the webpage as a target article to the server. The server obtains a summary of each article according to the processing in step 201~204, and outputs the summary to the terminal. Then, the terminal displays the summary in the browser. In this way, users may obtain the answer of each article through the web page, so there is no need to click to enter the body of the article to find.

According to the summary generation method provided in the above embodiment of the present application, after the target article is acquired, it may be determined whether a question is included in the headline of the target article. If the question is included in the headline, an information-satisfied-paragraph is determined in the body of the target article. Finally, a summary of the target article is generated based on the determined information-satisfied-paragraph. According to the method of the embodiment, it is possible to generate a summary that directly satisfies the users' demand for obtaining information.

Figure 4:
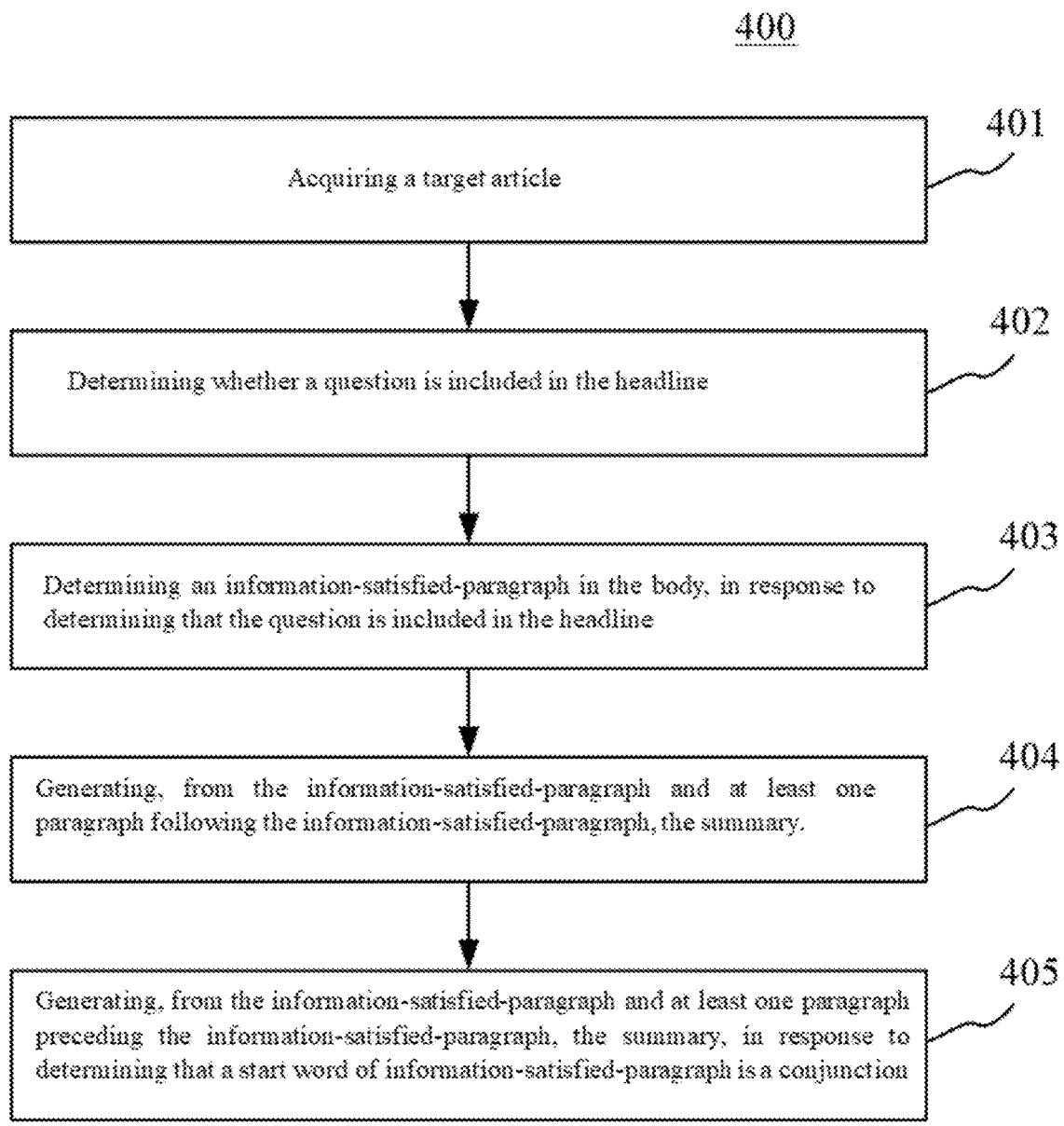
FIG. 4 is a flowchart of a summary generation method according to another embodiment of the present application.

Continuing with reference to FIG. 4, there is shown a flow 400 of another embodiment of a summary generation method according to the present application. As shown in FIG. 4, the summary generation method of the embodiment may include the following steps:

Step 401: Acquiring target article.

Step 402, determining whether a question is included in the headline.

Step 403, in response to determining that a question is included in the headline, determining an information-satisfied-paragraph in the body of the article.

The principles of steps 401, 402 and 403 are similar to the principles of steps 201, 202 and 203, so details are not described herein. After determining the information-satisfied-paragraph, the executive entity may generate a summary according to step 404 and/or step 405.

Step 404: generating a summary based on an information-satisfied-paragraph and at least one paragraph following the information-satisfied-paragraph.

In this embodiment, the executive entity may generate from an information-satisfied-paragraph and at least one paragraph following the information-satisfied-paragraph, the summary. Specifically, the executive entity may determine an information-satisfied-paragraph and two or three paragraphs following the information-satisfied-paragraph as a summary of the target article.

Step 405, generating, from the information-satisfied-paragraph and at least one paragraph preceding the information-satisfied-paragraph, the summary, in response to determining that a start word of the information-satisfied-paragraph is a conjunction.

The executive entity may further determine whether a start word of the information-satisfied-paragraph is a conjunction. If the start word is a conjunction, the executive entity may generate a summary based on the information-satisfied-paragraph and at least one paragraph preceding the information-satisfied-paragraph. For example, if the start word of the information-satisfied-paragraph is "however", it is considered that the summary generated by step 404 is incoherent. So the user feels abrupt when reading the summary, and the executive entity may generate, from at least one paragraph preceding the information-satisfied-paragraph and the information-satisfied-paragraph, and/or at least one paragraph following the information-satisfied-paragraph, the summary of the target article. For example, the executive entity may generate, from the information-satisfied-paragraph, one paragraph preceding the information-satisfied-paragraph, and one paragraph following the information-satisfied-paragraph, the summary.

In some alternative implementations of the embodiment, the executive entity may also generate a summary through the following steps not shown in FIG. 4: deleting invalid statements in at least one of: the information-satisfied-paragraph, at least one paragraph preceding the information-satisfied-paragraph, and at least one paragraph following the information-satisfied-paragraph; and generating the summary based on each paragraph with the invalid statements deleted.

In the embodiment, the executive entity may further perform a deletion processing on the information-satisfied-paragraph, at least one paragraph preceding the information-satisfied-paragraph, and at least one paragraph following the information-satisfied-paragraph. The deletion processing refers to deleting invalid statements in each paragraph. The above invalid statements may include, but are not limited to: statements for describing pictures, statements consistent with the headlines, and headers. The executive entity may generate the summary according to each paragraph with the invalid statements deleted.

In some alternative implementations of the embodiment, the executive entity may also generate a summary through the following steps not shown in FIG. 4: intercepting a plurality of sentences in the information-satisfied-paragraph in response to determining that a number of words in the information-satisfied-paragraph is greater than a preset word number threshold; and determining the intercepted sentences as the summary.

In the embodiment, the executive entity may also limit the number of words of the summary. If the number of words in the information-satisfied-paragraph is not greater than the preset word number threshold, the information-satisfied-paragraph and/or at least one paragraph preceding information-satisfied-paragraph and/or at least one paragraph following information-satisfied-paragraph may be the summary. However, it should be noted that if the number of words in the combination is greater than a preset word number threshold, the executive entity may intercept a plurality of sentences in the information-satisfied-paragraph, and determine the intercepted sentences as the summary.

According to the summary generation method provided in the above embodiment of the present application, the generated summary has consistency and conforms to the users' reading habits.

Figure 5:
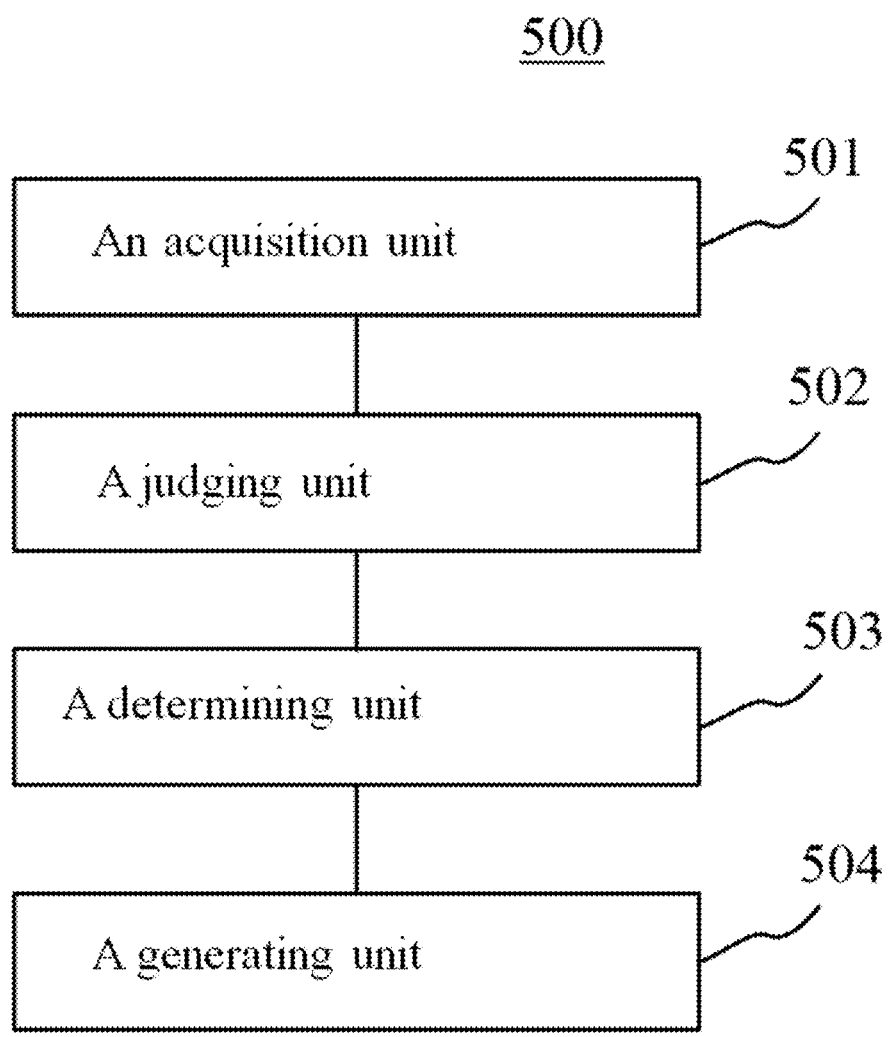
FIG. 5 is a structural schematic diagram of a summary generation apparatus according to an embodiment of the present application.

With further reference to FIG. 5, as an implementation of the method shown in each of the above figures, the present application provides an embodiment of a summary generation apparatus, which corresponds to the method embodiment shown in FIG. 2, and may be applied to various electronic devices.

As shown in FIG. 5, the summary generation apparatus 500 of the embodiment includes: an acquisition unit 501, a judging unit 502, a determining unit 503, and a generating unit 504.

The acquisition unit 501 is configured to acquire target article. The target article includes a headline and a body.

The judging unit 502 is configured to determine whether a question is included in the headline.

The determining unit 503 is configured to determine, in the body of the article, an information-satisfied-paragraph including an answer to the question, in response to determining that the question is included in the headline.

The generation unit 504 is configured to generate a summary of the target article based on a determined information-satisfied-paragraph.

In some alternative implementations of the embodiment, the judging unit 502 is further configured to perform at least one of: determining that the question is included in the headline, where the headline is an interrogative sentence; determining that the question is included in the headline, where the headline includes a referential relationship but does not include an object to which the referential relationship refers; and determining that the question is included in the headline, where the headline includes at least one word in a preset set of words.

In some alternative implementations of the embodiment, the determining unit 503 is further configured to determine similarities between the headline and each paragraph in the body of the article; and determine a paragraph corresponding to a maximum similarity of determined similarities as the information-satisfied-paragraph.

In some alternative implementations of the embodiment, the generating unit 504 is further configured to generate, from the information-satisfied-paragraph and at least one paragraph following the information-satisfied-paragraph, the summary.

In some alternative implementations of the embodiment, the generation unit 504 is further configured to generate, from the information-satisfied-paragraph and at least one paragraph preceding the information-satisfied-paragraph, the summary, in response to determining that a start word of information-satisfied-paragraph is a conjunction.

In some alternative implementations of the embodiment, the generating unit 504 is further configured to delete invalid statements included in at least one of: the information-satisfied-paragraph, at least one paragraph preceding the information-satisfied-paragraph, and at least one paragraph following the information-satisfied-paragraph; and generate the summary based on each paragraph with the invalid statements deleted.

In some alternative implementations of the embodiment, the generating unit 504 is further configured to intercept a plurality of sentences in the information-satisfied-paragraph in response to determining that a number of words in the information-satisfied-paragraph is greater than a preset word number threshold; and determine the intercepted sentences as the summary.

It should be understood that the units 501, 502, 503 and 504 described in the summary generation apparatus 500 correspond to the each step of the method described with reference to FIG. 2, respectively. Thus, the operations and features described above for the summary generation method are also applicable to the device 500 and the units included therein, which will not be described here.

Figure 6:
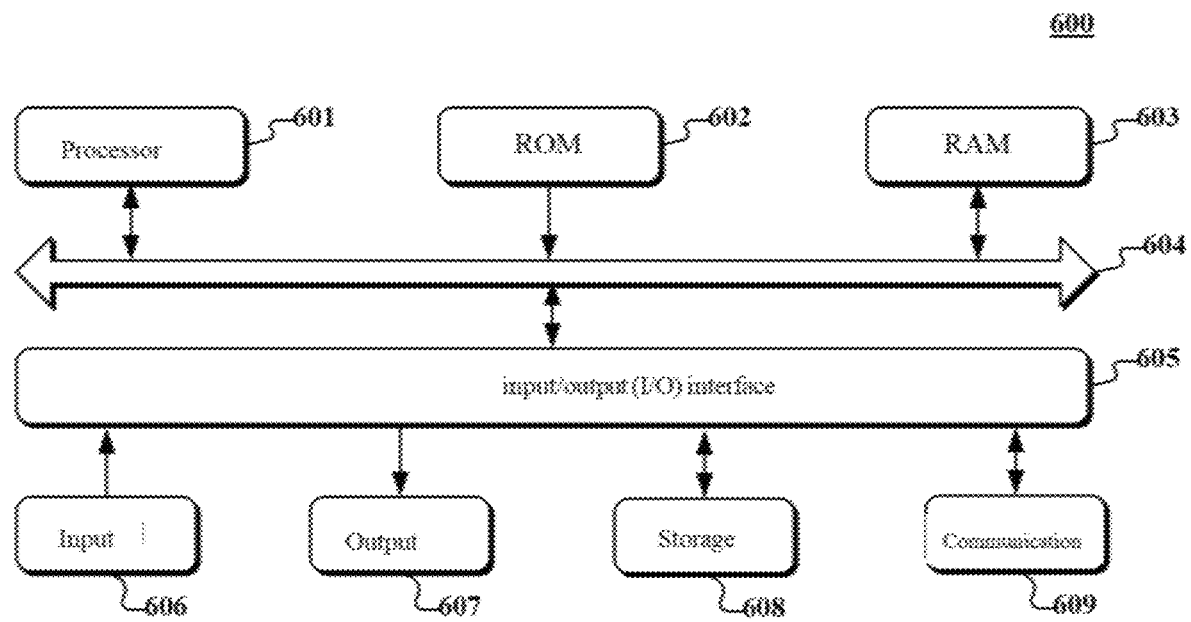
FIG. 6 is a structural schematic diagram of a computer system adapted to implement an electronic apparatus according to an embodiment of the present application.

Referring to FIG. 6, there is shown a structural schematic diagram of an electronic apparatus (e.g., a server or terminal devices in FIG. 1) 600 adaptable for implementing an embodiment of the present application. Terminal devices in embodiments of the present application may include, but are not limited to, mobile terminals such as mobile phones, laptops, digital broadcast receiver, PDAs (Personal Digital Assistants), PADs (Tablet Computers), PMPs (Portable Multimedia Players), in-vehicle terminals (e.g., in-vehicle navigation terminals), and the like, as well as fixed terminals such as digital TVs, desktop computers, and the like. The electronic apparatus shown in FIG. 6 is merely an example, and should not impose any restrictions on the function and scope of use of the embodiments of the present disclosure.

As shown in FIG. 6, the electronic apparatus 600 may include a processor (e.g., a central processing unit, a graphics processor, or the like) 601, which may perform various appropriate actions and processes according to a program stored in a read-only memory (ROM) 602 or a program loaded from a storage device 608 into a random access memory (RAM) 603. In the RAM 603, various programs and data required for operation of the electronic apparatus 600 are also stored. The processor 601, the ROM 602 and the RAM 603 are connected to each other via a bus 604. An input/output (I/O) interface 605 is also connected to the bus 604.

Generally, the following devices may be connected to the I/O interface 605: an input device 606 including, for example, a touch screen, a touchpad, a keyboard, a mouse, a camera, a microphone, an accelerometer, a gyroscope, and the like; an output device 607 including, for example, a liquid crystal display (LCD), a speaker, a vibrator, or the like; a storage device 608 including, for example, a magnetic tape, a hard disk, and the like; and a communication device 609. The communication device 609 may allow the electronic apparatus 600 to perform wired or wireless communication with other devices to exchange data. Although FIG. 6 illustrates the electronic apparatus 600 having various devices, it should be understood that no implementation or all of the devices shown are required. More or fewer devices may alternatively be implemented or provided. Each block shown in FIG. 6 may represent one device or multiple devices as desired.

In particular, according to embodiments of the present application, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, or may be installed from the storage device 608, or may be installed from the ROM 602. The computer program, when executed by the central processing unit (CPU) 601, implements the above mentioned functionalities as defined by the methods of the present disclosure. It should be noted that the computer-readable medium in the present application may be computer-readable signal medium or computer-readable storage medium or any combination of the above two. An example of the computer-readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present application, the computer-readable storage medium may be any physical medium containing or storing programs which may be used by a command execution system, apparatus or element or incorporated thereto. In the present application, the computer readable signal medium may include data signal in the base band or propagating as parts of a carrier, in which computer-readable program codes are carried. The propagating signal may take various forms, including but not limited to: an electromagnetic signal, an optical signal or any suitable combination of the above. The signal medium that may be read by computer may be any computer-readable medium except for the computer-readable storage medium. The computer-readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer-readable medium may be included in the electronic device; It may also be present alone and not fitted into the electronic device. The computer-readable medium carries one or more programs that, when executed by the electronic apparatus, cause the electronic apparatus to acquire target article, the target article including a headline and a body of the article; determining whether a question is included in the headline; in response to determining that the question is included in the headline, determining, in the body of the article, an information-satisfied-paragraph that includes an answer to the question; generating a summary of the target article based on the determined information-satisfied-paragraph.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions. The units or modules involved in the embodiments of the present application may be implemented by means of software or hardware. The described units or modules may also be provided in a processor, for example, described as: a processor, comprising an acquisition unit, a judging unit, a determining unit and a generating unit, where the names of these units or modules do not in some cases constitute a limitation to such units or modules themselves. For example, the acquisition unit may also be described as "a unit for acquiring a target article".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A summary generation method comprising:
   receiving a webpage processing request from a user terminal;
   acquiring a target article including a headline and a body of the article according to the received webpage processing request;
   determining whether a question is included in the headline;
   determining, in the body of the article, an information-satisfied-paragraph including an answer to the question, in response to determining that the question is included in the headline; and
   generating a summary of the target article based on the determined information-satisfied-paragraph, and sending the generated summary to the user terminal;
   wherein determining that the question is included in the headline comprises:
   determining that the question is included in the headline, in response to determining that the headline includes a referential relationship but does not include an object to which the referential relationship refers, and
   wherein generating a summary of the target article based on the determined information-satisfied-paragraph comprises:
   deleting invalid statements included: the information-satisfied-paragraph, one paragraph preceding the information-satisfied-paragraph, and one paragraph following the information-satisfied-paragraph, the invalid statements comprising statements for describing pictures, statements consistent with the headline, and a header; and
   generating the summary based on each paragraph with the invalid statements deleted.

2. The method according to claim 1, wherein determining that the question is included in the headline comprises further comprises:
   determining that the question is included in the headline, where the headline is an interrogative sentence; and
   determining that the question is included in the headline, where the headline includes at least one word in a preset set of words.

3. The method according to claim 1, wherein determining an information-satisfied-paragraph in the body of the article comprises:
   determining similarities between the headline and each paragraph in the body of the article; and
   determining a paragraph corresponding to a maximum similarity of determined similarities as the information-satisfied-paragraph.

4. The method according to claim 1, wherein generating a summary of the target article based on the determined information-satisfied-paragraph comprises:
   generating, from the information-satisfied-paragraph and at least one paragraph following the information-satisfied-paragraph, the summary.

5. The method according to claim 1, wherein generating a summary of the target article based on the determined information-satisfied-paragraph comprises:
   generating, from the information-satisfied-paragraph and at least one paragraph preceding the information-satisfied-paragraph, the summary in response to determining that a start word of information-satisfied-paragraph is a conjunction.

6. The method according to claim 1, wherein generating a summary of the target article based on the determined information-satisfied-paragraph comprises:
   intercepting a plurality of sentences in the information-satisfied-paragraph in response to determining that a number of words in the information-satisfied-paragraph is greater than a preset word number threshold; and
   determining the intercepted sentences as the summary.

7. A summary generation apparatus comprising:
   one or more processors; and storage devices on which one or more programs are stored, when the one or more programs are executed by the one or more processors, the one or more processors are caused to, receive a webpage processing request from a user terminal;

acquire a target article including a headline and a body of the article according to the received webpage processing request;

determine whether a question is included in the headline;

determine, in the body of the article, an information-satisfied-paragraph including an answer to the question, in response to determining that the question is included in the headline; and generate a summary of the target article based on the determined information-satisfied-paragraph, and send the generated summary to the user terminal;

wherein determining that the question is included in the headline comprises:

determining that the question is included in the headline, in response to determining that the headline includes a referential relationship but does not include an object to which the referential relationship refers, and wherein generating a summary of the target article based on the determined information-satisfied-paragraph comprises:

deleting invalid statements included: the information-satisfied-paragraph, one paragraph preceding the information-satisfied-paragraph, and one paragraph following the information-satisfied-paragraph, the invalid statements comprising statements for describing pictures, statements consistent with the headline, and a header; and generating the summary based on each paragraph with the invalid statements deleted.

8. The apparatus according to claim 7, wherein when the one or more programs are executed by the one or more processors, the one or more processors are further caused to perform:

determining that the question is included in the headline, where the headline is an interrogative sentence; and determining that the question is included in the headline, where the headline includes at least one word in a preset set of words.

9. The apparatus according to claim 7, wherein t when the one or more programs are executed by the one or more processors, the one or more processors are further caused to:

determine similarities between the headline and each paragraph in the body of the article; and determine a paragraph corresponding to a maximum similarity of determined similarities as the information-satisfied-paragraph.

10. The apparatus according to claim 7, wherein when the one or more programs are executed by the one or more processors, the one or more processors are further caused to:

generate, from the information-satisfied-paragraph and at least one paragraph following the information-satisfied-paragraph, the summary.

11. The apparatus according to claim 7, wherein when the one or more programs are executed by the one or more processors, the one or more processors are further caused to:

generate, from the information-satisfied-paragraph and at least one paragraph preceding the information-satisfied-paragraph, the summary in response to determining that a start word of information-satisfied-paragraph is a conjunction.

12. The apparatus according to claim 7, wherein when the one or more programs are executed by the one or more processors, the one or more processors are further caused to:

intercept a plurality of sentences in the information-satisfied-paragraph in response to determining that a number of words in the information-satisfied-paragraph is greater than a preset word number threshold; and determine the intercepted sentences as the summary.

* * * * *